(No Model.) 3 Sheets—Sheet 1.
T. R. TIMBY.
SYSTEM OF FIRING BATTERY GUNS IN TURRETS BY ELECTRICITY.
No. 312,231. Patented Feb. 10, 1885.
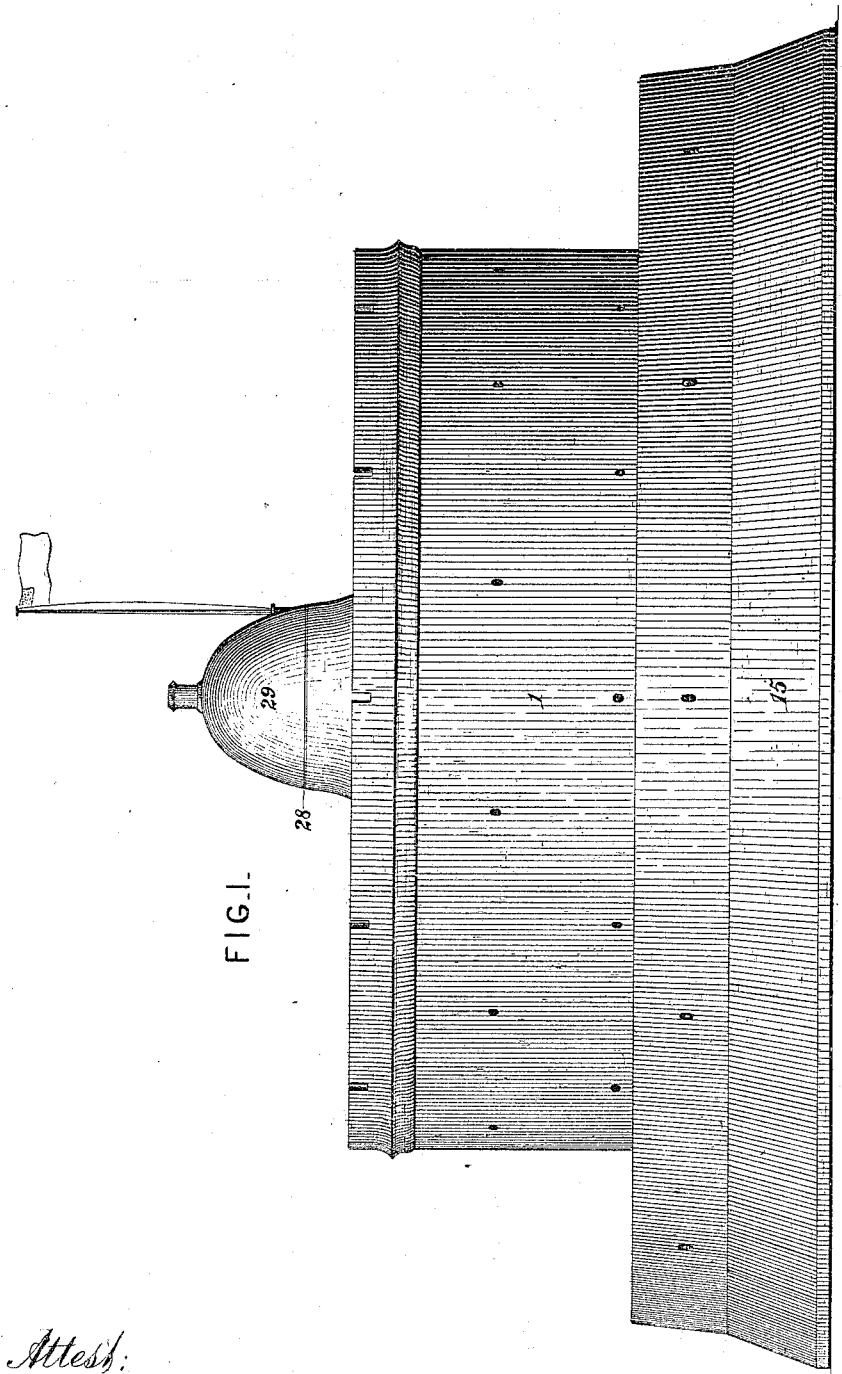

(No Model.) 3 Sheets—Sheet 2.
T. R. TIMBY.
SYSTEM OF FIRING BATTERY GUNS IN TURRETS BY ELECTRICITY.
No. 312,231. Patented Feb. 10, 1885.
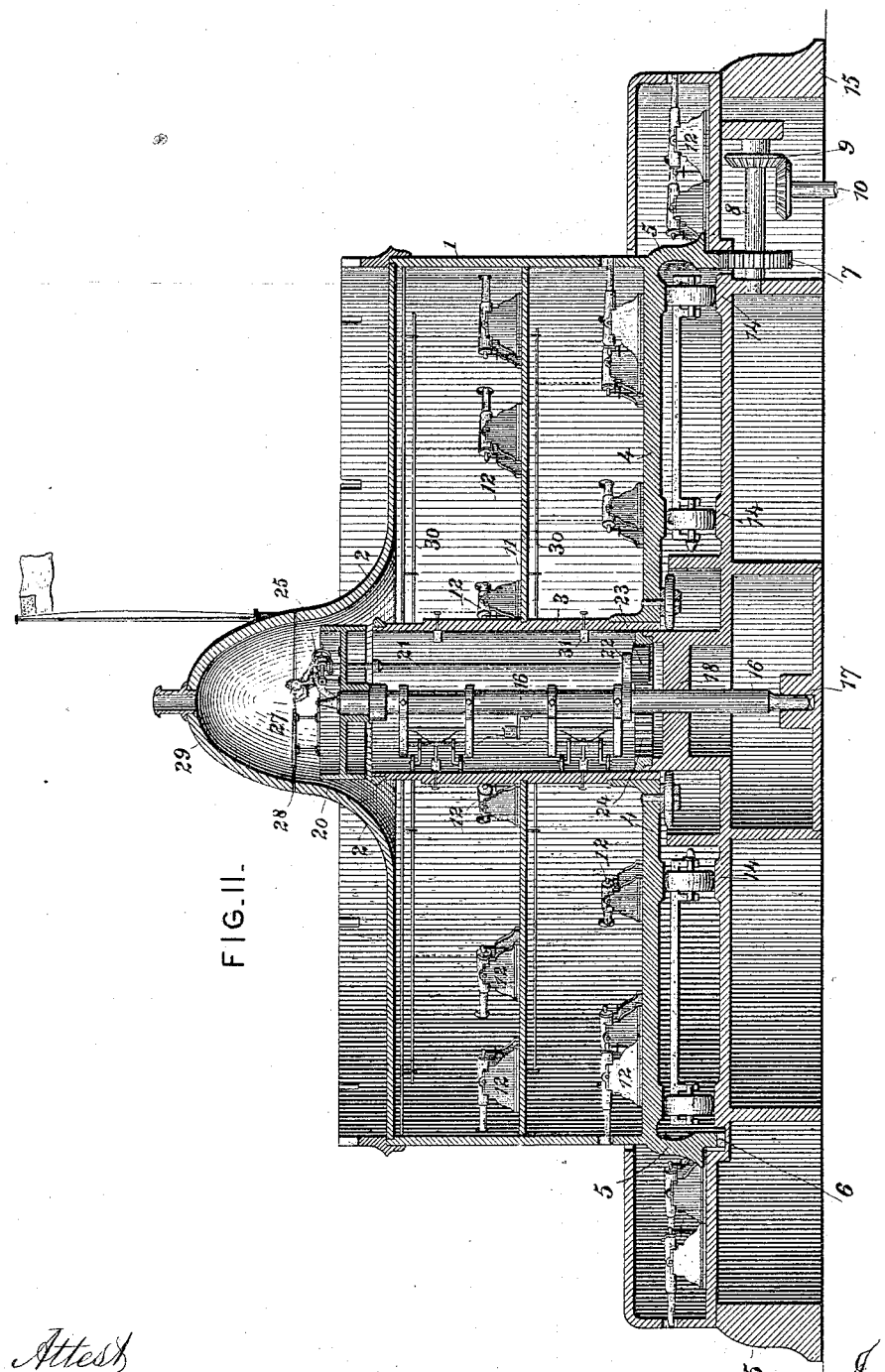

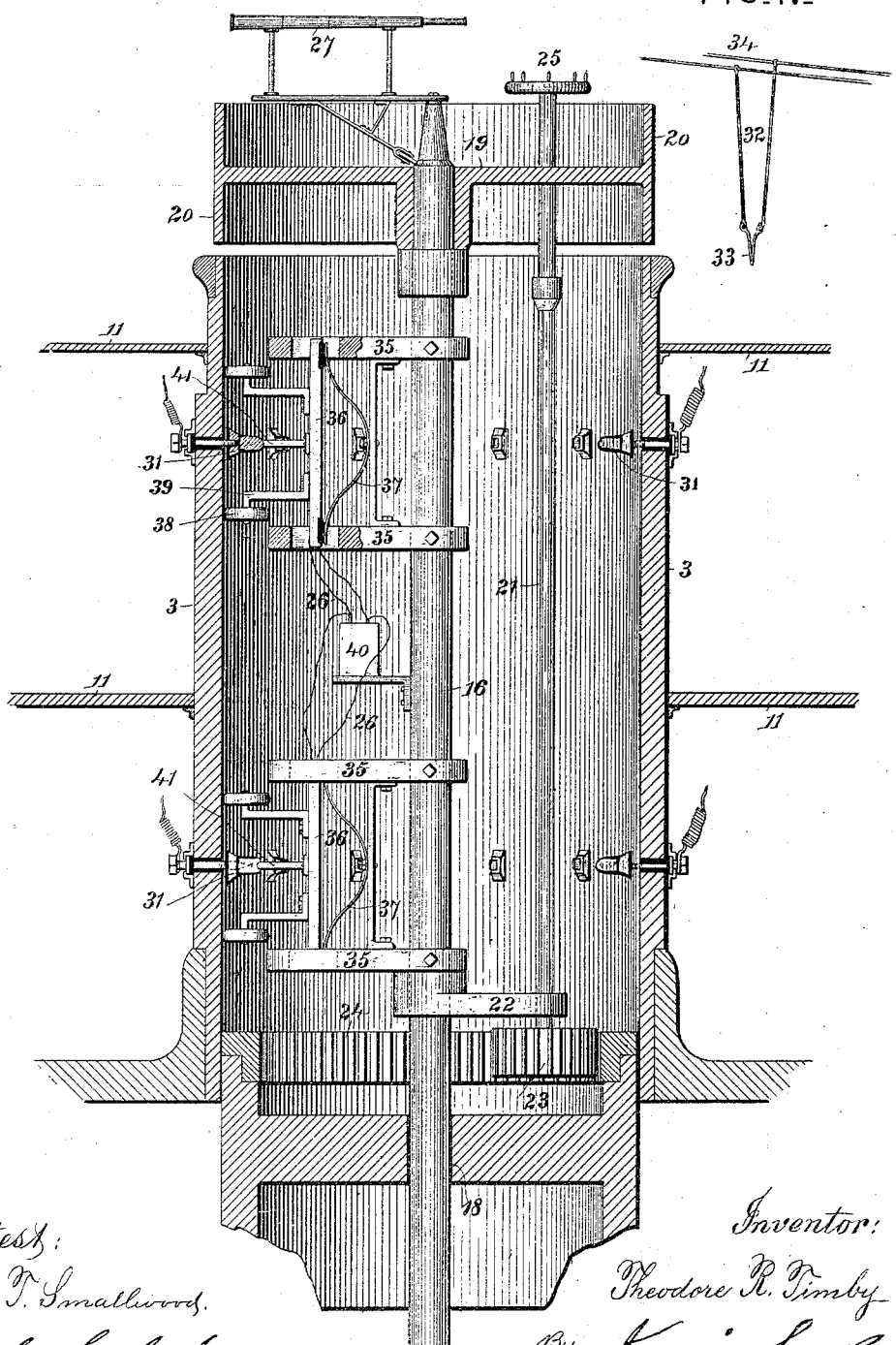

UNITED STATES PATENT OFFICE.

THEODORE R. TIMBY, OF NYACK, NEW YORK.

SYSTEM OF FIRING BATTERY-GUNS IN TURRETS BY ELECTRICITY.

SPECIFICATION forming part of Letters Patent No. 312,231, dated February 10, 1885.

Application filed December 20, 1884. (No model.)

*To all whom it may concern:*

Be it known that I, THEODORE R. TIMBY, a citizen of the United States, residing at Nyack, in the county of Rockland and State of New York, have invented a new and Improved Electric System of Firing Guns in Revolving Battery-Towers, of which the following is a specification.

The subject of my invention is a system of discharging guns in revolving battery-towers, by means of which each gun or vertical file of guns are discharged automatically and with precision as they reach the line of fire determined by the officer in charge, who is enabled to control and direct such line of fire with facility and accuracy.

In carrying out this invention I employ at the center of the revolving tower or turret a sighting-platform mounted on top of an independently-revolving vertical shaft, and carrying a telescopic or other "sight" in the same vertical plane, with a circuit-closer also carried by the said shaft and insulated therefrom, and operating in conjunction with circuit-closers in the inner wall of the revolving tower—one for each gun or vertical file of guns—to cause the automatic discharge of the said guns in succession as they reach the determined line of sight, the circuit-closer carried by the revolving shaft being for this purpose connected with wires from a suitable electric battery.

In order to obviate any serious difficulty which may exist in the practical operation of this system for effecting the automatic discharge of guns in revolving battery-towers, I have devised and used adjustable circuit-closers in the inner tower-wall, insulated from the said wall and adapted to be set in and out with accuracy, so as to cause them to work with precision and effect, in conjunction with the revolving circuit-closer on the central shaft connected with the battery. I have also mounted the circuit-closer, which is attached to the revolving central shaft on an adjustable insulated bar, so that this may be adapted to work with effect and precision in conjunction with the circuit-closers on the battery-tower. I have further devised a gage by which the circuit-closer on the central shaft may be automatically regulated in its position relatively to the circuit-closers on the tower, so as to obviate any practical difficulty in carrying this principle into effect with certainty and success under the stroke or shock liable to occur in the revolution of the tower under an enemy's fire. By this invention a perfect regularity in the automatic action is secured under any and all circumstances.

In order that the invention may be more clearly understood, I will proceed to describe it with reference to the accompanying drawings, in which—

Figure I is an elevation of a revolving battery-tower adapted for the use of my invention. Fig. II is a vertical section of the same. Fig. III is a vertical section of the inner cylindrical tower-wall and accessory parts on a larger scale, showing the details of the invention more clearly. Fig. IV is a detail view of the electrical primer and connected conducting-wires.

The revolving tower is constructed with external walls, 1, of necessary strength to resist an enemy's fire, and is preferably surmounted by a dome, 2. It is furthermore constructed with an internal cylindrical wall, 3, forming a well concentric with the external wall, 1, and with a revolving bed or floor, 4, on which the walls 1 and 3 are erected, so that the connected parts 1 2 3 4 revolve together. To effect this revolution of the tower the bed 4 is constructed with a downwardly-projecting flange, 5, terminating in a cogged rim or crown-wheel, 6, with which a pinion, 7, gears, the said pinion being keyed on a shaft, 8, driven by beveled pinions 9 from a shaft, 10, which is here shown broken off, and is in practice connected with a suitable motor. The revolving tower is furthermore constructed with any desired number of floors, 11, for the reception of the guns 12, and, in order that it may turn freely, is supported through the medium of wheels 13 upon rails 14 on the stationary bed or foundation 15. In the center of the tower, within the well 3, is a vertical shaft, 16, running in a step, 17, and an upper bearing, 18, both mounted in or forming part of the stationary foundation 15. The vertical shaft 16 carries at its upper end a platform, 19, surrounded by a curb, 20, and forming an upper bearing for a second vertical shaft, 21, whose lower bearing is in a horizontal arm, 22, projecting from the shaft 16. On the lower end of the shaft 21 is a pinion, 23, gearing with a cogged rim, 24, so that by the rotation of the shaft 21 the shaft 16, and with it the platform 19, will be revolved. This rotation of the shaft 21 is effected by a hand-wheel, 25, suitably connected. The platform 19, furthermore, carries a telescopic or other sight, 27, in line with a horizontal lookout, 28, in the cope 29, which covers the platform 19 and forms the central part of the dome 2.

For each of the guns 12, I provide a radial insulated conducting-bar, 30, connected electrically at its inner end with an adjustable electric contact-piece or circuit-closer, 31, in the well 3, and near its outer end by a wire, 32, with a primer, 33, the construction of which is shown in Fig. IV. Said primer is of suitable taper form to adapt it for insertion in the vent of the gun, and is provided with a second wire, 34, by which connection is made with the tower and the ground, or with the negative pole of the battery. The vertical shaft 16 also carries paired horizontal arms 35, in which are mounted radially-sliding bars 36, insulated from their supports and pressed outward by springs 37, the position of the bars 36 as to radial movement or adjustment, being determined by anti-friction rollers 38, bearing against the inner surface of the well 3, and running on lugs or arms 39, secured to the radially-sliding bars 36. The said bars 36 are insulated from the well, either by constructing the rollers 38 of glass, rubber, or other insulating material, or by the introduction of insulators between the arms 39 and bars 36. The radially-sliding bars 36 are connected by wires 26 with the positive pole of the battery 40, and the said radially-sliding bars carry circuit-closing springs 41, of platinum or other suitable metal, which, as the bars 36 are carried around by the shaft 16 and arms 35, close the circuit by contact with the successive insulated contact-surfaces 31, mounted in the well 3, one for every gun.

By the means thus described the officer standing upon the platform 19 can bring the sight 27 to bear on any desired point and there fix it by means of the hand-wheel 25, when all of the guns will, by the successive closing of the electric circuits, be discharged successively upon that point as the tower revolves, and by my invention this closing of the electric circuits is made certain and practically effective, and is protected or prevented from fatal derangement by jarring or violence to which the tower may be exposed from the enemy's fire.

The officer is provided with a suitable switch, by which he may at will throw the battery out of connection with the ground or with the insulated conductors, or both, or with one or other of the horizontal tiers of conductors leading to the respective horizontal tiers of guns. Such electric switch being of common construction does not require specific description.

Having thus described my invention, the following is what I claim as new therein and desire to secure by Letters Patent—

1. In a revolving battery-tower having electrical conductors for discharging guns, the independently-revolving shaft 16 within the same carrying circuit-closers 41, in combination with adjustable contact-surfaces 31 in the revolving tower, located in the path of movement of such circuit-closers and connected to the said conductors, as and for the purposes set forth.

2. In a revolving battery-tower having electrical conductors for discharging guns, the independently-revolving shaft 16, carrying separately-adjustable circuit-closers 41, in combination with contact-surfaces 31 on the revolving tower in the line of movement of the adjustable circuit-closers.

3. In a revolving battery-tower having electrical conductors for discharging guns, and contact-surfaces 31, connected with said conductors, the combination of the independently-revolving shaft 16 within the battery-tower, circuit-closers 41, carried thereby, springs 37, for forcing the circuit-closers against the contact-surfaces 31, located in the line of movement of such circuit-closers, and gaging devices for governing the movement of the circuit-closers relatively to their contact-surfaces, as herein shown and explained.

4. The combination, in a revolving battery-tower, of electrical conductors 30, having contact-surfaces 31, the sliding bars 36, and circuit-closers 41, carried by an independently-revolving shaft, 16, within the battery-tower, a spring, 37, bearing against the said sliding bar and pressing it radially outward, and the rollers 38, borne by the bar 36, for gaging the position of the circuit-closers 41 relatively to the contact-surfaces of the tower-conductors, as and for the purposes set forth.

THEODORE R. TIMBY.

Witnesses:
OCTAVIUS KNIGHT,
GEO. S. WHEELOCK.